United States Patent

Shinn

[15] 3,678,881

[45] July 25, 1972

[54] DEVICE FOR INDICATING CONTAMINATION OF A FLUID SUPPLY TO A FLUIDIC CIRCUIT

[72] Inventor: Jeffrey N. Shinn, Scotia, N.Y.

[73] Assignee: General Electric Company

[22] Filed: March 27, 1970

[21] Appl. No.: 23,254

[52] U.S. Cl. ................................. 116/70, 73/419, 127/556, 210/90, 340/366
[51] Int. Cl. ........................................................ G01l 19/12
[58] Field of Search ...................... 116/70, 114, 124; 73/419; 137/556; 210/25, 85, 90; 340/239, 240, 243, 366

[56] References Cited

UNITED STATES PATENTS

| | | | |
|---|---|---|---|
| 3,181,496 | 5/1965 | Bilbrey | 116/70 |
| 3,203,246 | 8/1965 | Horwitt et al. | 73/419 |
| 3,220,375 | 11/1965 | Gruber et al. | 116/70 |
| 3,237,591 | 3/1966 | Pichel | 116/124 |
| 3,325,010 | 6/1967 | Sackett | 210/90 |
| 3,442,248 | 5/1968 | Parkinson et al. | 116/70 |
| 3,474,906 | 10/1969 | Tennis | 210/90 |
| 3,556,044 | 1/1971 | Egresits | 116/70 |

*Primary Examiner*—Louis J. Capozi
*Attorney*—David M. Schiller, Arthur E. Fournier, Frank L. Neuhauser, Oscar B. Waddell and Joseph B. Forman

[57] ABSTRACT

A fluid flow filter having filter hole openings of a selected size or of size smaller than the smallest fluid opening in a fluid circuit being monitored by the contamination-indicating device is serially connected with a fluid flow restrictor for bypassing a small portion of the supply fluid. A pressure-sensitive indicator is connected to the juncture of the filter output and restrictor for indicating the pressure state at the juncture. A high pressure state indicates negligible contamination of the fluid whereas a low pressure state indicates substantial contamination thereof.

16 Claims, 5 Drawing Figures

Patented July 25, 1972 3,678,881

Inventor:
Jeffrey N. Shinn,
by Louis A. Moucha

DEVICE FOR INDICATING CONTAMINATION OF A FLUID SUPPLY TO A FLUIDIC CIRCUIT

My invention relates to a device for indicating the accumulated degree of contamination of a pressurized fluid supply, and in particular, to a device and method for bypassing a small portion of the supply fluid flow through a filter adapted to be more sensitive to contamination than a fluidic circuit being monitored.

Contamination of a pressurized fluid supply is of increasing importance in these days of concern with pollution. In particular, particle contamination of a fluid flowing in a pipe or tubing is important from both a health concern as well as a source of potential malfunction of devices supplied by such fluid. As one example, the effects of particle contamination on the operativeness of fluid amplifiers will be of specific concern herein.

Fluid amplifiers having no moving mechanical parts, and fluidic circuitry embodying such devices, have several advantages over similar electronic devices and circuits in that the fluidic version is inherently better adapted for operation under extreme environmental conditions of high temperature, nuclear radiation, shock, etc. However, the fluid amplifiers and circuits are subject to failure due to contamination of the fluid supplied to the individual amplifier elements. The most frequent cause of failure in fluid amplifiers is contamination of the fluid supplied to the power (main) fluid inlets of the amplifiers. This power fluid is supplied from a suitable pressurized source which may become contaminated with various type particles due to any number of reasons. The particles upon entering the fluid amplifier through the jet-forming power fluid restrictor (nozzle) may accumulate in a certain part of the amplifier to cause erratic operation of the amplifier, or if the particle is sufficiently large, may block the fluid flow in the power nozzle or in a restrictor (resistor) at the input thereto.

The prior art discloses one type of fluidic contamination indicator comprising a glass surface onto which a jet of the monitored fluid is directed. However, observer interpretation of the deposit on the glass is required to determine the extent of the contamination and thus such indicator is not very satisfactory.

Therefore, one of the principal objects of my invention is to provide an improved device for indicating the degree of pollution by contaminant particles in a pressurized fluid supply.

Another object of my invention is to provide an improved device for indicating the degree of contamination of a pressurized fluid supplied to a fluidic circuit.

Another object of my invention is to provide a new method for sensing the degree of contamination in the pressurized fluid supplied to the fluidic circuit.

Briefly stated, I provide a device and method for filtering a bypassed small portion of the supply fluid flow being monitored by the device. The filter has filter hole openings of a selected size or of size smaller than the smallest fluid opening in the monitored fluidic circuit and a pressure-sensitive indicator is disposed at the output end of the filter. The magnitude of the bypass flow is governed by a fluid flow restrictor disposed at the juncture of the filter and pressure indicator. A high pressure state at the juncture indicates negligible contamination of the fluid supply whereas a low pressure state indicates substantial contamination thereof.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings, wherein like parts in each of the several figures are identified by the same reference character, and wherein:

Figure 1:
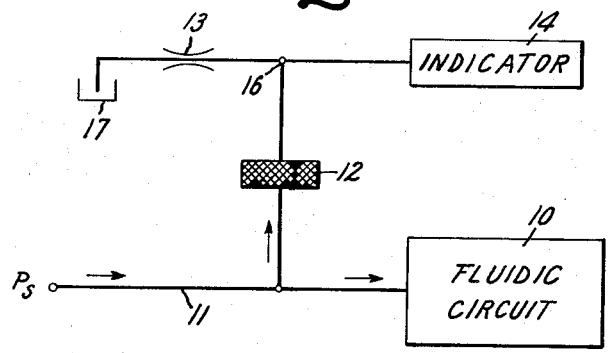
FIG. 1 is a schematic diagram of the contamination indicating device constructed in accordance with my invention.

Referring now to FIG. 1, there is shown a block designating a fluid circuit 10 being monitored by my invention. Although circuit 10 may be any fluid utilization means including a household water supply, the description herein will be directed to a fluidic circuit wherein one or more power fluid inlets of the corresponding one or more fluid amplifiers in circuit 10 are connected directly, or indirectly through restrictors (fluidic resistors), to a fluid flow passage 11 which supplies the pressurized power fluid thereto from a suitable pressurized power fluid source $P_s$. The fluid medium may be a gas, such as air, or a liquid, such as water or oil. Passage 11 may be any suitable tubing or other enclosed channel.

The device comprising my invention forms a bypass circuit comprising fluid flow filter 12, vented fluid flow restrictor 13 and a pressure-sensitive indicator 14. The directions of fluid flow to fluidic circuit 10 and to my device are indicated by the three arrowheads. Filter 12 may comprise a wire mesh or porous metal, as examples, and has an input end in fluid communication with passage 11 and an output end in fluid communication with a juncture 16. Restrictor 13 may be a discrete fluidic element of the orifice or laminar type, physically connected to the output of filter 12, but alternatively is a hole of predetermined size through the wall of a tubular member 20 enclosing filter 12 and indicator 14 as illustrated in FIGS. 2a, 2b, 3a, 3b. The purpose of restrictor 13 is to provide sufficient resistance to fluid flow therethrough to limit the bypass flow typically to less than 10 percent of the total supply fluid flow. The output end of restrictor 13 is vented to atmosphere, or, in the case wherein the fluid medium is a liquid, the output end of restrictor 13 is connected to a suitable drain, the vent or drain being indicated by symbol 17. The juncture 16 also provides connection to the pressure-sensitive indicator 14 which provides a visual or audible indicator or read-out of the pressure state at the output end of filter 12. Pressure-sensitive indicator 14, in general, comprises two elements, a pressure-sensitive member and a display member in communication therewith for providing a visual or audible read-out corresponding to the state of the pressure-sensitive member. The pressure-sensitive indicator may be of the digital or proportional type as described hereinafter with reference to FIGS. 2a, 2b, 3a, 3b to thereby develop a digital or proportional read-out associated with the display member.

The flow area of filter 12 is sufficiently large such that in the condition where negligible contamination exists in the fluid flowing in passage 11, the pressure at juncture 16 is essentially the supply pressure $P_s$ existing in passage 11. The filter hole openings are of size smaller than the smallest fluid opening in fluidic circuit 10 being supplied from passage 11 such that filter 12 is the most contamination-sensitive element in the system including fluidic circuit 10. In general, the size (area or diameter in the case of circular openings) of the filter hole openings are approximately 50 percent of the size (area or width) of the smallest fluid opening in circuit 10, or smaller, and in all cases are less than approximately 80 percent of the smallest fluid opening. Thus, in the case of the smallest power fluid opening in the fluid amplifier circuit 10 being of 0.010 inch width, the filter holes (which may be circular in outline) are of less than 0.008 inch diameter to insure capture of any contaminating particles having dimension correspondingly greater than the filter hole dimensions. The filter hole opening size is dictated primarily by the particular requirements in each application and in all cases is less than the opening size of any other filters in the system. It is assumed that a main filter (not shown) is included in an upstream portion of supply fluid passage 11 for filtering out the more coarse contaminating particles as well as, to a certain degree, smaller particles.

My fluidic contamination-indicating device operates in the following manner. Under conditions of negligible contamination of the fluid in passage 11, the pressure magnitude at juncture 16 is substantially equal to the pressure $P_s$ of the fluid in passage 11. In response to this first pressure condition, the display member provides a read-out indicating the absence of contamination. Under conditions of substantial contamination of the fluid, the pressure at juncture 16 is substantially less than $P_s$ due to a considerable pressure drop across the filter being blocked by the contaminant particles. In the case of the pressure-sensitive member or display member of indicator 14 being of the digital type, the display member read-out is operative in two corresponding states indicating negligible contamination or substantial contamination. In the case of a proportional type pressure-sensitive member and display member, the read-out is operative over a range of degree of contamination. My fluidic contamination-indicating device therefore provides an indication of whether the main filter has passed contaminants which could cause a component failure in fluidic circuit 10.

Figure 2A:
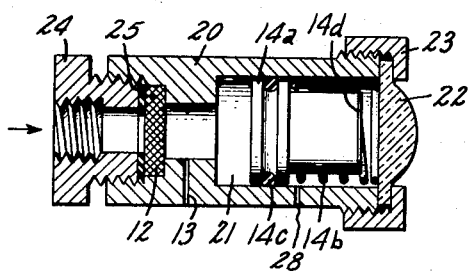
FIGS. 2a, 2b are two embodiments of my device operative in a proportional mode and provided with a visual indicator.

Referring now to FIG. 2a, there is shown a first embodiment of my device adapted to provide a proportional type read-out. The device includes a tubular member 20 adapted to enclose filter 12 and pressure-sensitive indicator 14. The pressure-sensitive member of indicator 14 includes a piston 14a contained within a cylindrical chamber 21 and a helical spring 14b which applies an opposing force to the fluid pressure force exerted on the left end of the piston as viewed on FIG. 2a. A suitable piston ring 14c, such as an O-ring, is fitted into an annular groove in the shoulder portion of the piston for conventionally sealing the gap between the piston and cylinder wall. The main body of the piston is of smaller cross section for containing the spring 14b in place around the piston main body and for retaining a first end of the spring against the inner end of the shoulder of piston 14a. A vent hole 28 formed through the side of member 20 in the region of the piston main body equalizes the pressure therein with the ambient. The end of the main body of piston 14a spaced from the shoulder is coated with a conventional fluorescent material 14d forming the display member of pressure-sensitive indicator 14. A suitable lens 22 is positioned against the output end of tubular member 20 and retained in place by means of internally threaded collar member 23 which is engaged with the externally threaded output end portion of member 20. Lens 22 also retains the second end of spring 14b. The input end of hollow member 20 is internally threaded and engaged by coupling member 24 which functions to retain filter 12 within member 20 and against an upstream end of a shoulder portion of member 20 separating the cylindrical chamber 21 and the threaded input end. A suitable gasket 25 is positioned between filter 12 and the output end of coupling member 24 for securing a fluid-tight seal at the threaded connection of members 20 and 24. The input (upstream) end of hollow member 20 is internally threaded only up to the region wherein filter 12 is located. Coupling member 24 is also threaded at its input end to provide a means for connecting to a threaded fitting end of a tubing or other suitable fluid flow passage (not shown) which conveys the bypassed pressurized supply fluid from passage 11 to my device. The direction of fluid flow to the input of my device is indicated by the arrowhead. The fluid flow restrictor 13 is a small diameter hole drilled through the side of tubular member 20 intermediate filter 12 and cylindrical chamber 21. Restrictor 13 is of predetermined cross section and known length (0.003 to 0.005 inch diameter, three-fourths inch length as one example) to provide a desired fluid flow resistance, generally sufficient to bypass less than 10 percent of the total supply fluid flow in the passage 11.

My device may be attached to the front panel of an apparatus containing one or more fluidic circuits 10 being monitored by my contamination-indicating device. My FIG. 2a device operates in the following manner. In the initial condition of negligible contamination of the supply fluid flow in passage 11, filter 12 remains relatively unobstructed by contaminant particles and therefore only an insignificant pressure drop develops across the filter. As a result, the fluid between filter 12 and piston 14a is substantially at the supply pressure $P_s$ and develops a relatively high fluid force against the upstream end of the piston sufficient to overcome the spring force and move the piston with its fluorescent surface 14d against the inner surface of lens 22. Vent hole 28 prevents any pressure build-up in the space between the lens and piston shoulder. Under this condition, fluorescent surface 14d is closely coupled to the ambient light existing beyond the outer surface of lens 22 and the fluorescent surface thereby exhibits maximum fluorescence. This maximum fluorescence condition is therefore indicative of negligible contamination of the supply fluid in the FIG. 2a embodiment.

In the condition of substantial contamination of the fluid in passage 11, the bypassed fluid flowing through filter 12 causes an accumulation of contaminant particles therein, thereby developing a significant pressure drop across the filter. The pressure drop increases with increasing accumulated (time integrated) contamination in an approximately proportional manner and the resultant decreasing fluid pressure in the region between the filter and piston permits the spring force to overcome the fluid force and thereby move the piston with its fluorescent surface 14a away from lens 22, as indicated in FIG. 2a. This device is thus seen to be of the proportional type in that as the degree of accumulated contamination increases and fluorescent surface 14d recedes from lens 22, the fluorescence decreases proportionately, and at some substantial degree of contamination, the distance between fluorescent surface 14d and the inner surface of lens 22 is sufficiently great that the fluorescence effect is completely absent.

It should be appreciated that filter 12 is responsive to both cumulative contamination at low levels as well as transient contamination at high levels, either of which effects can cause malfunction of fluidic circuit 10. In both cases the filter is removed, cleaned and replaced, or a new filter substituted when the fluidic circuit 10 is serviced upon the device indicating a substantial contamination, or at a lower contamination, as predetermined for each specific application.

Spring 14b and its associated spring constant is the element of my device most readily adapted for varying the sensitivity of my device. Thus, sensitivity is increased by substituting a spring having a higher spring constant, although such substitution results in a smaller range of degree of contamination being monitored due to the greater movement of piston 14a for the same change in contamination degree. The readily disengageable coupling member 24 permits ease of replacement of filter 12. This ease of replacement of the filter is also advantageous in substituting a filter having larger or smaller size filter hole openings as the particular application may demand.

Figure 2B:
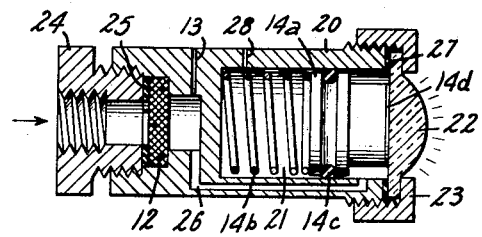

A modification and preferred embodiment of the contamination-indicating device illustrated in FIG. 2a is shown in FIG. 2b wherein the directions of the spring and fluid forces impressed on piston 14a are opposite of those in the FIG. 2a embodiment. The device of FIG. 2b is similar to that of FIG. 2a insofar as the input end of the device including filter 12 and bypass restrictor 13 are concerned. The distinctions are in the formation of two separate chambers in hollow member 20 and the provision of a passage 26 for introducing the bypassed fluid to the opposite side of piston 14a from that in the FIG. 2a embodiment. The first (input) chamber in hollow member 20 contains filter 12 and restrictor 13 and the second (output) chamber (cylindrical chamber 21) contains piston 14a and spring 14b. Fluid flow passage 26, formed longitudinaly within the wall of member 20, interconnects the end of the input chamber downstream of filter 12 with chamber 21 at the far end thereof such that the fluid after passing through filter 12 enters chamber 21 in the region on the far side of the shoulder of piston 14a. A suitable gasket 27 is inserted between lens 22 and the end of hollow member 20 for assuring a fluid tight seal thereat. Chamber 21 also includes vent hole 28 formed through the side thereof in the region on the near side of the shoulder of piston 14a for equalizing the pressure therein with the ambient.

The device of FIG. 2b is seen to provide a visual read-out in the opposite sense from that of the device in FIG. 2a. Thus, in the case of negligible contamination of the supply fluid, the pressure of the fluid passing through filter 12 and passage 26 to the far end of chamber 21 is substantially equal to the pressure $P_s$ of the fluid in passage 11. This relatively high pressure fluid develops a sufficiently high fluid force exerted against the shoulder portion of piston 14a to overcome the spring force exerted by spring 14b and thereby move the piston in a direction away from lens 22. Thus, in the negligibly contaminated condition of the fluid, fluorescent surface 14a is retracted from lens 22 sufficiently such that the fluorescence effect is completely absent. With increasing degree of contamination, the fluid pressure in passage 26 decreases and the spring force is thus able to overcome the fluid force and move the piston toward lens 22 to produce increasing florescence from surface 14d. In the substantially contaminated state of the fluid, fluorescent surface 14d is in contact with the inner surface of lens 22, as illustrated, and maximum fluorescence is visible. Thus, the device of FIG. 2a is employed when a nonfluorescent (i.e., nonvisible) read-out is desired to indicate substantial contamination, and the device of FIG. 2b is employed when a fluorescent (i.e., visible) read-out is desired. Both of the devices of FIGS. 2a and 2b are operative in a proportional mode in that they provide read-outs varying over a range of fluorescence intensities corresponding to a range of degrees of contamination of the fluid in passage 11. These devices are of the nonelectrical type and are especially useful in applications where the absence of electrical power is dictated, or, where other power sources are unavailable.

Figure 3A:
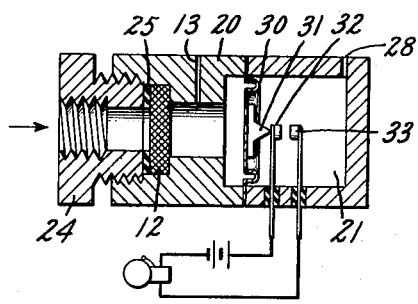
FIGS. 3a and 3b are two embodiments operative in a digital mode and adapted for use with an electrical audible and visual indicator, respectively.

Referring now to FIG. 3a, there is shown a contamination-indicating device constructed in accordance with my invention which utilizes an electrical display member providing an audible read-out as opposed to the visual read-out in FIGS. 2a and 2b. The input end of the device including filter 12 and restrictor 13 may be identical to that illustrated in FIG. 2a. The distinctions between the two embodiments is within chamber 21, the FIG. 3a embodiment employing a diaphragm member 30 in place of the piston 14a – spring 14b combination in FIG. 2a. The edges of diaphragm 30 are supported in the side wall of hollow member 20 and a projection 31, preferably of an electrically insulating material, is disposed on the downstream side of the diaphragm and centrally thereof. Diaphragm 30 may be constructed of any suitable flexible material such as a metallic membrane or rubber. A pair of electrical contacts 32, 33 are disposed downstream of projection 31 and are supported by contact arms passing through the walls of member 20 and electrically insulated therefrom. The first of the contacts 32 is more closely spaced from projection 31 than is contact 33. The pressure-sensitive member, diaphragm 30, is preferably of the snap-action type to minimize contact arcing, although its flexure may vary proportionally with applied pressure, if desired. In the negligibly contaminated state of the fluid wherein the pressure of the fluid between filter 12 and diaphragm 30 is essentially at the supply fluid pressure $P_s$, the resultant flexure of the diaphragm causes projection 31 to bear against contact 32 and to move it to meet with contact 33 thereby completing an electrical circuit to an audible read-out such as an electric bell connected in series with a battery across contacts 32 and 33 externally of member 20. In the substantially contaminated state of the fluid, the lower fluid pressure at the upstream side of diaphragm 30 causes the diaphragm to assume a nonflexed state whereby contacts 32 and 33 are separated and the audible alarm circuit is therefore open, as illustrated. The contamination-indicating device of FIG. 3a thus provides an electrical digital type read-out wherein an audible, or other type, read-out is obtained during the condition of negligible contamination of the fluid in passage 11. Obviously the nonelectrical visual proportional read-out illustrated in FIG. 2a could be substituted for the audible digital read-out in FIG. 3a by positioning a fluorescent-coated diaphragm close to the right end of tubular member 20, and substituting lens 22 for the right enclosing end of tubular member 20. Vent passage 28 is utilized for the same purpose as vent 28 in FIGS. 2a, 2b.

Figure 3B:
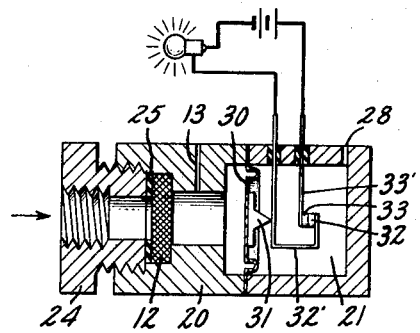

Referring now to FIG. 3b, there is shown a modification and preferred embodiment of the electrical digital-read-out contamination-indicating device illustrated in FIG. 3a. The distinctions between the FIGS. 3a and 3b embodiments are in the form of contact arm 32' associated with contact 32 and the read-out or display member. Contact arm 32' is somewhat U-shaped such that a force impressed on the long member thereof by means of diaphragm projection 31 causes contact 32 to separate from contact 33. The contacts in the FIG. 3b embodiment are maintained in a separated state during a relatively noncontaminated condition of the fluid in passage 11 due to flexure of diaphragm 30. Upon filter 12 becoming substantially blocked with contaminant particles, the pressurized fluid between filter 12 and diaphragm 30 is at a low pressure due to the substantial pressure drop across the contaminant-laden filter, and diaphragm 30 assumes the nonflexed state whereby the contacts become mated as shown, thereby completing an electrical circuit to an externally located read-out or display member such as the electric bell in FIG. 3a or an electric lamp as in FIG. 3b. It should be apparent that the lamp (and bell) may also be contained in the output end of member 20, the lamp being adjacent a suitable lens of the type shown in FIGS. 2a, 2b, and even the electrical power supply therefor may be self-contained. Thus, the pressure-sensitive member in FIG. 3b is operative in the same preferred sense as in FIG. 2b, namely, that the display member or read-out is activated in the substantially contaminated condition of the fluid as opposed to the opposite sense of operation in the FIGS. 2a and 3a embodiments. The embodiments illustrated in FIGS. 2a, 2b and 3a, 3b are fail-safe and can be checked simply by disconnecting the fluid supply to the input of the device to determine proper operation of the read-out. Thus, in the case of the FIGS. 2a and 3b embodiments, and assuming a noncontaminated condition of the fluid and activated state of the read-outs, disconnection of the fluid input causes the respective visual and audible read-outs to become inactivated due to a simulation of a contaminated fluid condition. In the case of the FIGS. 2b 3b devices, disconnection of the fluid input causes the read-outs thereof to change from inactivated to activated.

From the foregoing description, it can be appreciated that my invention makes available a new device and method for indicating cumulative contamination in a pressurized fluid supplied to a fluidic circuit. It should be readily apparent that the device can also be utilized in applications such as monitoring particle pollution of household water supplies and particle contamination of oxygen gas supplies, and the like. In these latter applications, the filter hole openings are of size determined by the maximum particle size to be tolerated in the particular fluid system being monitored. The device is relatively simple, reliable, and in the case of the digital read-out, requires no interpretation. The FIGS. 2a, 2b embodiments can also provide a digital read-out by providing a suitable detent in the sidewall of chamber 21 such that the shoulder of piston 14a is prevented from moving until a fluid force sufficient to overcome the restraining force of the detent is applied. Having described four embodiments of my contamination-indicating device and three types of read-outs associated therewith, it can be appreciated that other types of pressure-sensitive indicators may also be utilized to sense the fluid pressure at the downstream side of the filter and indicate such pressure state in any of a number of visual and audible forms.

What I claim as new and desire to secure by Letters Patent of the United States is:

1. A device for indicating the degree of particle contamination in a pressurized fluid supplied to a fluidic circuit, said contamination-indicating device comprising
   a fluid flow filter provided with filter hole openings of size smaller than the smallest fluid opening in a fluid circuit being monitored by the contamination-indicating device, said filter having an upstream end adapted for connection to a passage supplying the pressurized fluid to the monitored fluidic circuit, a fluid flow restrictor having a first end in fluid communication with the downstream end of said filter at a first juncture and a second end vented to thereby bypass a portion of the fluid flowing in the passage to the monitored fluidic circuit, and pressure-sensitive indicator means in fluid communication with the first juncture for indicating the relative pressure magnitude of the bypassed fluid at the first juncture wherein the relative pressure magnitude corresponds to the relative degree of particle contamination of the fluid supplied to the monitored fluidic circuit.

2. The contamination-indicating device set forth in claim 1 wherein said pressure-sensitive indicator means comprises a proportional-type pressure-sensitive member for providing response over a range of values of pressure corresponding to a range of degree of contamination of the fluid supplied to the monitored fluidic circuit, the degree of contamination increasing with reduced pressure at the first juncture.

3. The contamination-indicating device set forth in claim 1 wherein said pressure-sensitive indicator means comprises a digital-type pressure-sensitive member for providing a two-state response to the pressure at the first juncture, a high pressure state at the first juncture corresponding to negligible contamination of the fluid supplied to the monitored fluidic circuit and a low pressure state corresponding to substantial contamination thereof.

4. The contamination-indicating device set forth in claim 1 wherein said pressure-sensitive indicator means comprises, a fluid pressure-sensitive member in fluid communication with the first juncture, and a display member in communication with said pressure-sensitive member and operable therewith for providing a read-out as a function of the relative pressure magnitude at the first juncture.

5. The contamination-indicating device set forth in claim 4 wherein said fluid pressure-sensitive member is of the digital type, said display member providing a digital read-out as a function of the relative pressure magnitude at the first juncture, said fluid pressure-sensitive member being operative in a first state wherein the pressure at the first juncture is substantially equal to the pressure of the fluid supplied to the monitored fluidic circuit in the condition of negligible contamination thereof, and being operative in a second state wherein the pressure at the first juncture is substantially less than the pressure of the fluid supplied to the monitored fluidic circuit in the condition of substantial contamination thereof, said display member providing an indication distinguishing the two conditions of fluid contamination.

6. The contamination-indicating device set forth in claim 4 wherein said fluid pressure-sensitive member is of the proportional type, said display member providing a proportional read-out as a function of the relative pressure magnitude of tee first juncture, said fluid pressure-sensitive member being operative over a range of pressure magnitudes corresponding to a range of degrees of contamination of the fluid supplied to the monitored fluidic circuit, said display member providing an indication of the degree of contamination wherein the degree of contamination increases with reduced pressure at the first juncture.

7. The contamination-indicating device set forth in claim 1 wherein said fluid flow restrictor provides a resistance to fluid flow therethrough for limiting the bypass fluid flow to less than 10 percent of the total supply fluid flow.

8. The contamination-indicating device set forth in claim 1 wherein the size of the filter hole openings are approximately 50 percent of the smallest fluid opening in the monitored fluidic circuit.

9. The contamination-indicating device set forth in claim 1 wherein the size of the filter hole openings are less than 80 percent of the smallest fluid opening in the monitored fluidic circuit.

10. The contamination-indicating device set forth in claim 4 wherein said display member being of the visual type for providing the contamination degree read-out in visual form.

11. The contamination-indicating device set forth in claim 4 wherein said display member being of the audible type for providing the contamination degree read-out in audible form.

12. The contamination-indicating device set forth in claim 4 wherein said pressure-sensitive member comprises a piston contained within a hollow member further containing said filter, said restrictor comprising a passage through a wall of said hollow member and disposed intermediate said filter and piston, and said display member comprising a fluorescent coating on an end surface of said piston, said piston adapted for motion axially within said hollow member in response to the pressure of the bypassed fluid at the downstream end of said filter whereby the condition of fluorescence of the fluorescent end of said piston corresponds to the relative degree of contamination of the fluid supplied to the monitored fluidic circuit.

13. The contamination-indicating device set forth in claim 4 wherein said pressure-sensitive member comprises a diaphragm contained within a hollow member further containing said filter, said restrictor comprising a passage through a wall of said hollow member and disposed intermediate said filter and diaphragm, and said display member comprising a pair of electrical contacts contained within said hollow member and disposed in proximity with the downstream side of said diaphragm, said diaphragm adapted for flexure in response to the pressure of the bypassed fluid at the downstream side of said filter, the diaphragm flexure causing movement of one of the pair of contacts for separating or mating said contacts to thereby respectively open or complete an electrical circuit including an electrical power source and an electrical display member.

14. A device for indicating the degree of particle contamination in a pressurized fluid flowing in a passage, said contamination-indicating apparatus comprising a fluid flow filter provided with filter hole openings of size equal to the maximum size particle to be tolerated in a pressurized fluid flowing in a passage, said filter having an input end adapted for connection to the passage, the flow area of said filter being sufficiently large to cause a negligible pressure drop across the filter in a nonparticle-laden state thereof, a fluid flow restrictor having an input end in fluid communication with the output end of said filter, and an output end vented to thereby bypass a small fraction of the fluid flowing in the passage, a fluid pressure-sensitive member in fluid communication with the juncture of the filter and restrictor, and a display member in communication with said pressure-sensitive member and operable therewith for providing a read-out indicative of the relative fluid pressure magnitude at the filter-restrictor juncture wherein a pressure magnitude substantially equal to the pressure of the fluid in the passage and corresponding to negligible accumulated particle contamination of the fluid is indicated by a nonactivated condition of said display member, and a pressure magnitude substantially less than the pressure of the fluid in the passage and corresponding to substantial accumulated particle contamination of the fluid is indicated by a fully activated condition of said display member.

15. A method for indicating the degree of particle contamination in a pressurized fluid supplied to a fluidic circuit comprising the steps of bypassing less than 10 percent of a pressurized fluid flowing in a passage to a fluidic circuit by passing the bypassed fluid through a fluid flow restrictor, filtering the bypassed fluid by passing the bypassed fluid through a fluid flow filter provided with filter hole openings of size smaller than the smallest fluid opening in the fluidic circuit, sensing the pressure of the bypassed fluid at the downstream side of the filter, and providing a read-out of the sensed pressure at the downstream side of the filter wherein a sensed pressure of magnitude substantially equal to the pressure of the fluid flowing in the passage to the fluidic circuit is indicative of negligible contamination of the fluid and a sensed pressure of magnitude substantially less is indicative of substantial particle contamination.

16. A method for indicating the degree of particle contamination in a pressurized fluid flowing in a passage comprising the steps of bypassing a small fraction of a pressurized fluid flowing in a passage by passing the bypassed fluid through a fluid flow restrictor, filtering the bypassed fluid by passing the bypassed fluid through a fluid flow filter provided with filter hole openings of size smaller than the maximum size particle to be tolerated in the fluid, sensing the pressure level of the bypassed fluid at the downstream side of the filter, and displaying the sensed pressure level of the bypassed fluid by providing a read-out thereof wherein a high pressure level corresponding to negligible contamination of the fluid is indicated by a nonactivated state of a read-out device, and a low pressure level corresponding to substantial particle contamination of the fluid is indicated by a fully activated state.

* * * * *